United States Patent

Weir et al.

[11] 4,070,033
[45] Jan. 24, 1978

[54] TRANSPORT SYSTEM OF HIGHWAY VEHICLES

[75] Inventors: Gary L. Weir, Denton; Velmo Johnson, Mabank, both of Tex.

[73] Assignee: Pullman Incorporated, Chicago, Ill.

[21] Appl. No.: 705,742

[22] Filed: July 15, 1976

[51] Int. Cl.² .......................................... B62D 53/00
[52] U.S. Cl. ................................ 280/423 A; 280/407
[58] Field of Search .............. 280/407, 423 R, 423 A, 280/477

[56] References Cited

U.S. PATENT DOCUMENTS

| | | | |
|---|---|---|---|
| 2,330,897 | 10/1943 | Kirksey | 280/423 A |
| 3,197,237 | 7/1965 | Smith | 280/423 A X |
| 3,339,942 | 9/1967 | Ratkovich | 280/423 A |
| 3,413,015 | 11/1968 | Fontaine | 280/407 X |
| 3,438,652 | 4/1969 | Hoffacker | 280/423 A |
| 3,542,390 | 11/1970 | Fikse | 280/423 A X |

*Primary Examiner*—Joseph F. Peters, Jr.
*Assistant Examiner*—R. Schrecengost
*Attorney, Agent, or Firm*—Thomas G. Anderson

[57] ABSTRACT

A transport system of highway vehicles comprises a highway tractor which is connected to a highway trailer vehicle by means of an intermediate dolly. The dolly includes an inclined frame supported at its lower rear end on a running gear and its forward end includes a king pin connected to the tractor fifth wheel. A fifth wheel for connection to the highway trailer is movably mounted on the inclined frame.

2 Claims, 4 Drawing Figures

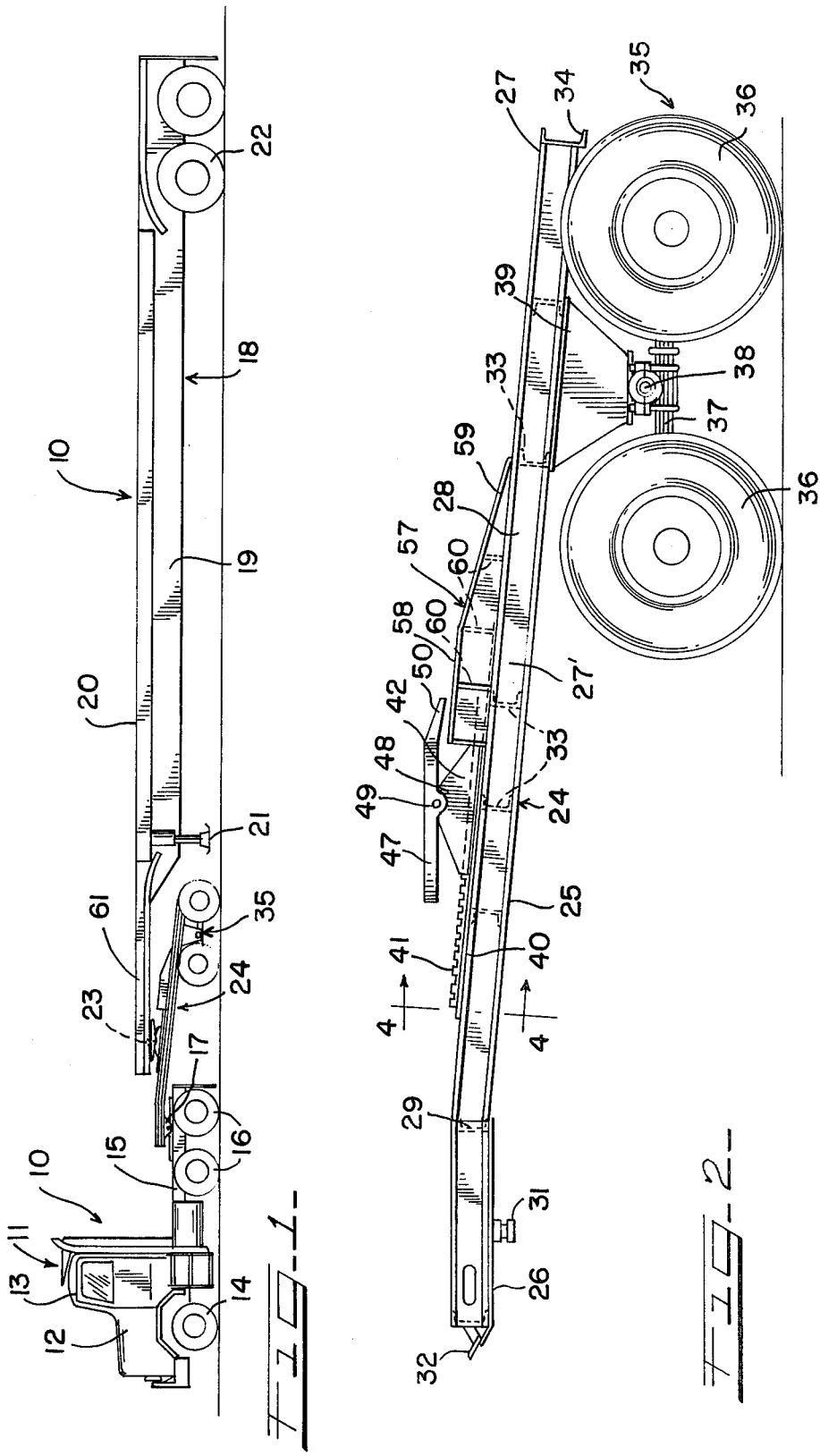

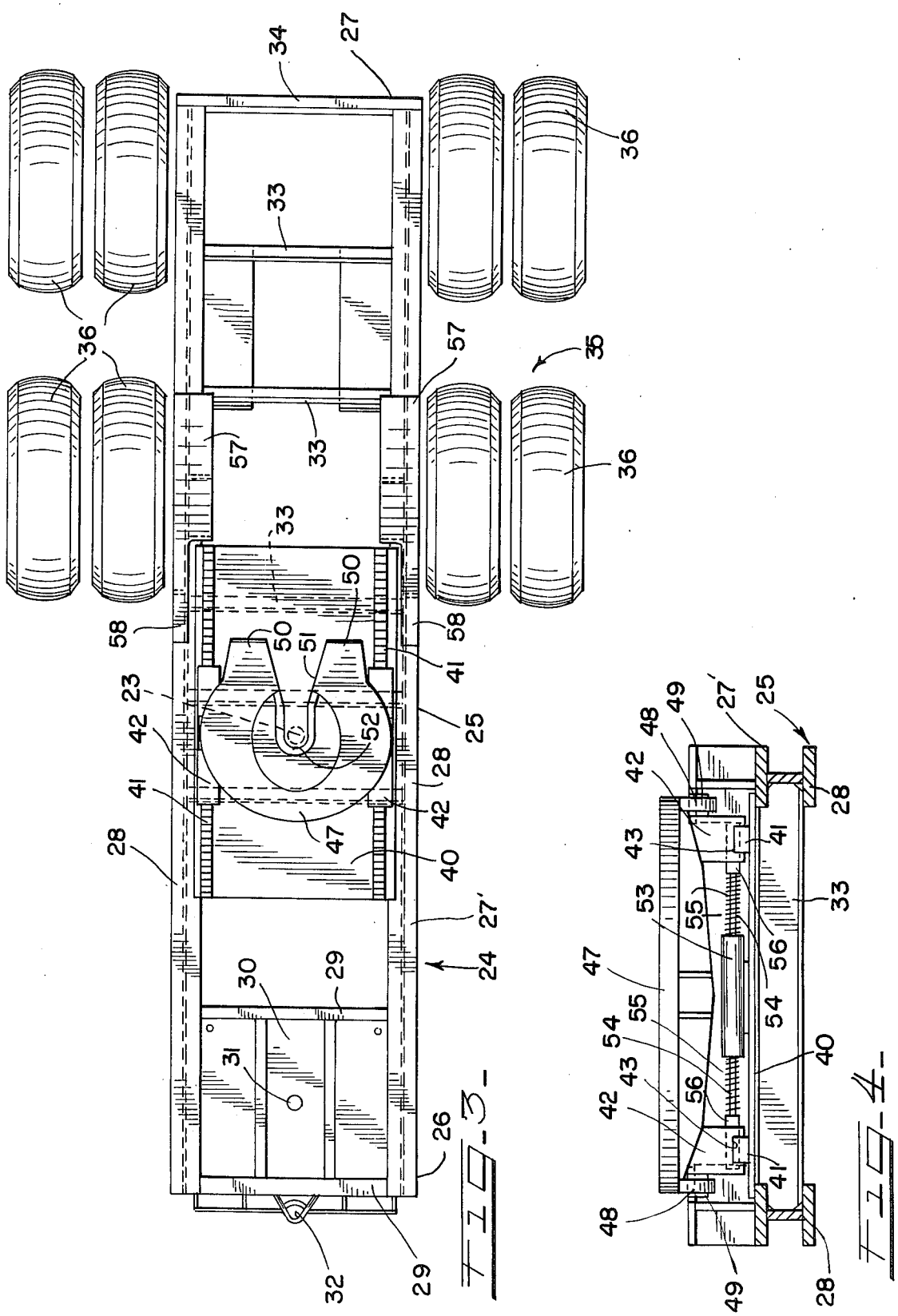

TRANSPORT SYSTEM OF HIGHWAY VEHICLES

BACKGROUND OF THE INVENTION

1. Field of the Invention

The field of the invention relates to highway vehicles which are connected in train from including a highway tractor, an intermediate dolly and a trailing vehicle.

2. Description of the Prior Art

In the prior art highway transport systems to which the present invention pertains generally include an intermediate dolly of Z-shaped construction which includes a goose neck front end including a king pin which is connected to the fifth wheel of the highway tractor. The goose neck also consist of a vertical connecting wall which in turn is rigidly secured to the jeep which is connected to the dolly horizontal frame construction. The dolly may include several tandem running gear constructions depending upon the weight which is to be transported on the main load carrying platform of the trailing vehicle. The trailing vehicle also generally comprises a deck and goose neck fifth wheel construction which in turn is supported on the dolly. These particular designs of the prior art are required for transporting extremely heavy objects over the road and must distribute the loads over wheeled suspensions and running gear in conformity with the varying laws of the interstate system. The present invention is an improvement over the previous designs in that the goose neck construction is eliminated and an improved dolly which is readily available for interconnecting the trailer vehicle and the highway tractor and which will easily permit the transfer of weight from one point on the dolly frame to another point as desired. The inclined frame and shiftable fifth wheel of the dolly also provided for ground clearance height adjustment of the front end of the trailer.

SUMMARY OF THE INVENTION

The present invention pertains to an improved dolly for interconnecting a highway tractor to a trailing vehicle to provide an improved transport system. In the present design a highway dolly includes a fifth wheel which is normally positioned at a point which is half way between the vertical center line of the axles of the dolly running gear and the king pin of the tractor. The fifth wheel is slidable forwardly and rearwardly on the inclined frame a distance of 18 inches either way thus weight transfer of the trailer load may be shifted more forwardly to the rear drive wheels of the highway tractor or it may be shifted rearwardly to the running gear of the dolly as required to meet different state requirements. At the same time the distance between the center line of the tractor suspension and the dolly suspension is great enough to allow maximum state load requirements to be met. Thus great loads per axle may be legally transported. A most important feature of the sloping or inclined frame of the dolly is the fact that fore and aft adjustment of the fifth wheel raises and lowers the pulled trailer front end. Thus, the load divider dolly of the present invention permits load transfer to meet the many different requirements of interstate commerce. The inclined dolly also permits easier connection of the trailer king pin to the fifth wheel of the dolly by virtue of a guide bracket arrangement supported on the dolly frame which guides the trailer king pin into the jaw of the fifth wheel.

BRIEF DESCRIPTION OF THE DRAWINGS

FIG. 1 is a side elevational view of a transport system consisting of a highway tractor, an interconnecting dolly, and a trailing vehicle;

FIG. 2 is an enlarged side elevational view of the intermediate dolly arrangement;

FIG. 3 is a plan view of the dolly arrangement disclosed in FIG. 2; and

FIG. 4 is a cross-sectional view taken substantially along the line 4—4 of FIG. 2.

DESCRIPTION OF THE PREFERRED EMBODIMENT

Referring particularly to FIG. 1, a transport system 10 comprises a highway tractor 11 having an engine compartment 12, a cab 13, and steering gear 14. The tractor also includes a flat rear body 15 supported on a driven running gear of tandem type and the body 15 supports a fifth wheel 17 of conventional design.

A trailer vehicle is designated at 18 and includes side frame members 19 supporting a flat deck or bed 20. The vehicle 18 may be of unusual length and strength construction for transporting oversize and extremely large objects of all types. The vehicle 18 also includes a tandem rear running gear construction and is provided at its forward end with a conventional king pin 23 adapted to fit into a conventional fifth wheel. The trailer 18 also includes a landing gear strut 21.

As best shown in the FIGS. 2 and 3, an intermediate jeep dolly is designated at 24 and includes a frame 25. The frame 25 comprises a forward frame portion 26 and a rearward frame portion 27 interconnected by an intermediate sloping frame 27'. The sloping frame also can be defined as being inclined rearwardly and downwardly. The frame 25 comprises longitudinally extending frame members 28 of I-beam configuration and are interconnected by front cross members 29 supporting a box structure 30 in turn supporting a conventional king pin 31. The front cross member also has connected thereto a tow hook 32. Additional transverse support members 33 are interconnected along the length of the longitudinally extending frame members 28 and a rear channel 34 is connected at the rearward frame portion 27.

The dolly vehicle 24 is supported on a conventional tandem running gear 35 comprising pneumatic tire and wheel assemblies 36 supported on a spring suspension 37 in turn connected to an axle construction 38. The axle construction 38 is rigidly secured to an axle end connecting frame structure 39 suitably connected to the longitudinal side frame members 28 and certain of the cross members 33.

As best shown in FIG. 3, the intermediate sloping frame portion 27' also has connected thereto a platform 40 which rigidly has connected thereto longitudinally extending parallel rack bars 41. A pair of fifth wheel support brackets designated at 42 have their underneath portions recessed as indicated at 43 and these portions are relatively slidable with repsect to the rack bars 41. The fifth wheel support brackets 42 are connected to the ears 48 of a fifth wheel plate 47 by means of pivot members 49. Thus, by virtue of the recessed support brackets 42 in their engagement with the rack bars 41, the fifth wheel plate 47 is slidable from the position shown in FIG. 2, longitudinally forwardly and rearwardly. In the position shown in FIG. 2, the fifth wheel is centrally positioned between the axle 38 and the king pin 31 and can be moved 18 inches in either direction with respect thereto.

The fifth wheel plate 47 is of a conventional design and need not be further described except that it includes gathering portions 50 provided with a V-shaped gathering opening or jaw 51 leading to a king pin receiving slot 52 adapted to received the king pin 23 of the trailing vehicle 18. Longitudinally movable fifth wheels are well known in the art and include lock and release mechanisms 53 generally disclosed in FIG. 4 of the drawings. Such mechanisms include lock rods 54 which project laterally outwardly from the lock and release mechanisms 53 having lock plungers 56 disposed at the ends thereof which engage the teeth of the racks for locking the fifth wheel in a plurality of longitudinally adjusted and locked positions along the racks 41. The plungers 56 and lock rods 54 are spring loaded by means of the spring 55 and are normally in the engaging position as shown in FIG. 4 wherein the fifth wheel is locked in position. To move the fifth wheel, a suitable handle lever arrangement, not disclosed, withdraws the rods 54 inwardly out of engagement with the rack teeth so that the fifth wheel may be moved as desired.

In order to facilitate the engagement of the king pin 23 of the trailer 18 with the king pin opening or slot 52 guide brackets 57 are provided. The guide brackets 57, as best shown in FIGS. 2 and 3, are rigidly supported on top of the frame members 28 and each include a support surface 58 parallel to the frame members 28 and another inclined or sloping surface 59 which extends downwardly to the level of the upper surface of the frame members 28. The surface 58 is vertically spaced from the gathering portions 50 of the fifth wheel so that when the highway tractor and dolly is moved rearwardly the neck 61 of the trailer 18 slides up the inclined surface 59 across the parallel surface 58. Thus, the king pin 23 is properly centered and moves into the slot of the fifth wheel as desired. The guide brackets 57 also include transfer support gussets 60.

The present dolly arrangement discloses a very effective component of the total system in that the sloping frame permits a shorter dolly construction than that which is found in the goose neck constructions of the prior art. Dollys of this type are particularly necessary in the handling of large oversize and overweight loads for which the weight transfer characteristics must be readily adjusted to meet the many varied laws of the states through which the system must be transported. By virtue of its design, the present arrangement permits quick adjustment of its weight transfer characteristics by merely moving the fifth wheel of the dolly forwardly or rearwardly, thereby shifting or increasing the loading on either the rear wheels or running gear of the dolly or the rear running gear of the highway tractor.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a vehicle transport system including a highway tractor having a first running gear and first fifth wheel, a trailer vehicle having a deck and a supporting second running gear and including a first king pin, the improvement of a dolly for interconnecting said tractor and trailer vehicle comprising, a frame, said frame including a forward portion having a second king pin connected to said first fifth wheel, said frame including a rearward portion having a third running gear connected thereto, said frame including a portion extending in downwardly inclined relation from said forward portion to said rearward portion, a second fifth wheel on said frame connected to said first king pin, means adjustably mounting said second fifth wheel on said inclined frame portion whereby said second fifth wheel and first king pin connection may be moved to a plurality of locked positions on said frame, guide means on said frame adapted to be engaged by said trailer vehicle for guiding said first king pin into locked position with respect to second fifth wheel, said guide means including a pair of longitudinally extending guide members, connected in transversely spaced relation on said inclined portion of said frame, each of guide members having a first upper guide portion, each of said guide members having a second upper guide portion extending rearwardly of said second fifth wheel and downwardly in inclined relation, said second fifth wheel having a king pin receiving jaw facing rearwardly with respect to said frame, and said second upper inclined portions of said guide members being positioned rearwardly of said king pin receiving jaw, said means adjustably mounting said second fifth wheel being disposed below the level of said first upper guide portions, each of said first upper guide portions being spaced laterally outward from said means adjustably mounting, and said second upper guide portions being wider than said first upper guide portions and extending inwardly thereof and being disposed athwart and in shielding relation to said means adjustably mounting said second fifth wheel.

2. The invention in accordance with claim 1, said means slidably mounting said second fifth wheel including a rack supported on said inclined frame portion, and means on said second fifth wheel releasably connecting the same to said rack.

* * * * *